C. A. SWINEHART.
VEHICLE TIRE.
APPLICATION FILED JAN. 24, 1913. RENEWED JUNE 22, 1914.
1,105,342. Patented July 28, 1914.
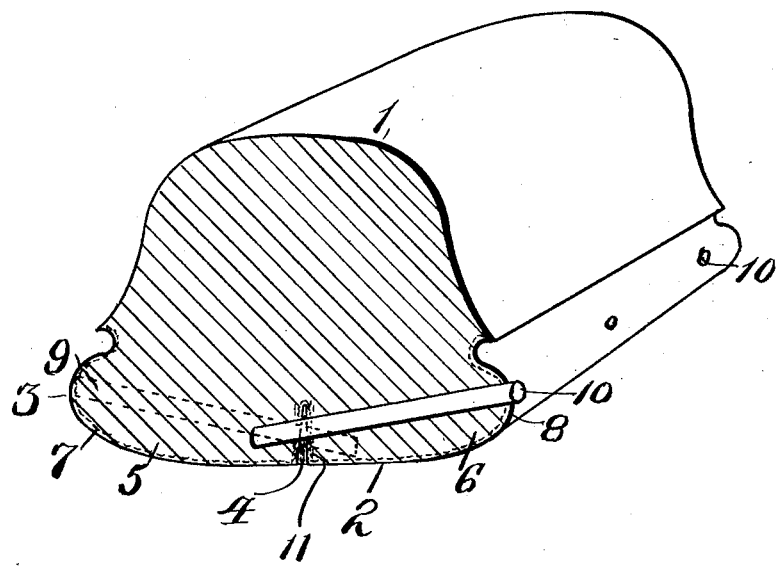
Witnesses:
Clyde Hoffman
T. L. McClintock
Inventor
Clark Allen Swinehart
by C. E. Humphrey
Atty.

UNITED STATES PATENT OFFICE.

CLARK ALLEN SWINEHART, OF AKRON, OHIO.

VEHICLE-TIRE.

1,105,342.  Specification of Letters Patent.  Patented July 28, 1914.

Application filed January 24, 1913, Serial No. 743,951. Renewed June 22, 1914. Serial No. 846,699.

*To all whom it may concern:*

Be it known that I, CLARK ALLEN SWINEHART, a citizen of the United States, residing at Akron, in the county of Summit and State of Ohio, have invented new and useful Improvements in Vehicle-Tires, of which the following is a specification.

This invention relates to improvements in vehicle tires, especially of the solid type, in which there are provided a circumferentially-extending series of transversely-positioned wires in the base of the tire and the object of the invention is to provide means for holding the inner or submerged ends of the transverse wires against longitudinal movement in unison with the tread portion of a tire. By thus anchoring the inner or submerged ends of the cross wires against longitudinal movement the grip of the clencher flanges of the rim in which the tire is mounted is increased and made more certain.

In order to accomplish this object it is contemplated that the inner face of the base of the tire will be initially grooved circumferentially and that the fabric usually used on the base of the tire will be carried up into this groove and the ends of the transverse wires will extend through the fabric lining the faces of the longitudinal groove which ultimately forms a radial partition to thereby anchor the inner or submerged ends of the cross wires against movement.

With the foregoing and other objects in view, the invention consists in the novel construction, combination and arrangement of parts constituting the invention to be hereinafter specifically described and illustrated in the accompanying drawing which forms a part hereof wherein is shown the preferred embodiment of the invention, but it is to be understood that changes, variations and modifications can be resorted to which come within the scope of the claim hereunto appended.

The drawing presented is a perspective view of a section of a tire embodying this invention.

Referring more specifically to the drawing the reference numeral 1 denotes the tread of a tire embodying this invention and which is provided with a base 2. The lateral portions of the base are provided with longitudinally-extending beads 3 of suitable formation to permit the tire when manufactured to be seated in a clencher tire rim. The base of the tire is originally formed with a longitudinal and preferably centrally-arranged groove or slit 4 thereby temporarily dividing the base of the tire into the two portions 5 and 6. The base of the tire is further provided with a layer of fabric 7 which preferably extends around the faces of the beads 3 and outwardly into the slit 4 so that the side faces of the slit 4 are covered previous to vulcanization. The lining of fabric within the slit 4 when the tire is ultimately cured constitutes a radially-projecting and circumferentially-extending partition 11.

Positioned within the base of the tire are two series of transversely-extending crossbars or wires 8 and 9. The members of each series extending from the outer face of one of the beads 3 laterally inwardly and preferably inclined inwardly toward the wheel center and extending through the partition of fabric, and their ends inclosed within the rubber of the base, that is to say, the series of cross wires 8 will have their inner or submerged ends terminating in the portion 5 of the base and the inner or submerged ends of the series 9 will have their ends terminating in the portion 6 of the base and wholly inclosed by the rubber. Further the members of the series 8 will alternate in position with respect to the members of the series 9. It is contemplated when the tire is mounted on a vehicle wheel provided with a clencher rim the latter will engage the outer ends 10 of the wires 8 and 9 and frictionally hold the tire against movement or creeping and at the same time the inner or submerged ends of the cross wires will be held against longitudinal movement through the medium of the fabric partition 7.

In manufacturing this tire the slit 4 is made by a properly placed knife in the tube machine which forms the tire body. The fabric partition is then positioned and the tire cured preferably in a mold, causing the two portions 5 and 6 to unite thereby closing the slit 4 and intimately uniting the portions with the fabric partition so that the latter is wholly submerged or embedded in the rubber of the base of the tire and at the same time the base of the tire is formed into an integral mass.

The cross wires 9 and 10 are preferably positioned after vulcanization, by inserting them through the beads 3 and driving them through the fabric partition.

I claim:

An elastic tire for vehicles embodying a tread and a base, the latter being provided with laterally-extending beads to receive the inturned clencher flanges of a wheel rim, two series of transversely-extending cross wires embedded in the base, the members of each series alternating and extending from the beads on one side, and an anchorage embedded within the tire and engaging the cross wires at a point removed from the inner ends of the wires.

In testimony whereof I have hereunto set my hand in presence of two subscribing witnesses.

CLARK ALLEN SWINEHART.

Witnesses:
C. E. HUMPHRY,
A. L. McCLINTOCK.

Copies of this patent may be obtained for five cents each, by addressing the "Commissioner of Patents Washington, D. C."